United States Patent
McClure et al.

[11] 3,908,780
[45] Sept. 30, 1975

[54] MOTORCYCLE SAFETY SYSTEM

[76] Inventors: Clifford McClure, Sumerco, W. Va. 25567; Marvin G. McClure, Box 230, Rt. 1, Yawkey, W. Va. 25573

[22] Filed: Sept. 25, 1974

[21] Appl. No.: 509,122

[52] U.S. Cl. .............................. 180/82 R; 280/293
[51] Int. Cl.² ........................................ B60K 28/00
[58] Field of Search............ 180/30, 82 R, 111, 112; 280/293, 301; 200/61.12

[56] References Cited
UNITED STATES PATENTS

| | | | |
|---|---|---|---|
| 1,976,308 | 10/1934 | Thomas............................ | 180/82 R |
| 1,998,990 | 4/1935 | Hasselbaum........................ | 180/111 |
| 2,300,762 | 11/1942 | Andrews.............................. | 180/30 |
| 2,960,351 | 11/1960 | Jeffress.............................. | 280/293 |
| 3,608,285 | 9/1971 | Berk .............................. | 180/103 X |
| 3,811,704 | 5/1974 | Gregoric.......................... | 280/293 X |

*Primary Examiner*—David Schonberg
*Assistant Examiner*—Terrance L. Siemens
*Attorney, Agent, or Firm*—Sherman and Shalloway

[57] ABSTRACT

A safety system for motorcycles including a limit switch mounted on the motorcycle within the electrical circuit of the engine, the switch being biased normally to preclude operation of the engine and being positioned to be closed by lifting of the kickstand to its running position thereby permitting operation of the engine.

5 Claims, 4 Drawing Figures

U.S. Patent   Sept. 30,1975   3,908,780

MOTORCYCLE SAFETY SYSTEM

BACKGROUND OF THE INVENTION

There is a danger inherent in the use of motorcycle kickstands if and when the rider forgets to raise the kickstand prior to driving the machine. In its lowered position, a kickstand interferes with or limits the degree to which the machine can lean in the direction of the side on which the kickstand is installed. If the stand is left in its lowered position when the machine is driven, an attempt at making a left turn or a turn into the kickstand can result in disaster, upon engagement of the kickstand with the ground.

Where an immediate turn is necessary, such as in avoidance of traffic or an obstacle, the delay in turning or the prevention of a turn by the lowered kickstand can be fatal to the rider.

Where a turn against a lowered kickstand is attempted at high speed, engagement of the kickstand with the road can throw or "pole vault" the machine out of control with a consequent injury or killing of the rider.

BRIEF DISCUSSION OF THE PRIOR ART

Prior attempts have included the use of weakened springs for holding the kickstand in its lowered position, thereby attempting to minimize the interference of the kickstand, if it is inadvertently left in its lowered position, on the theory that the stand will then be easily swung up to its stowage position by its engagement with the ground.

Another feature which can be modified in an attempt to facilitate stowage of a kickstand which is forgotten in its lowered position is the depth of the detent into which the arm of the stand is urged by the spring. The shallower the detent, the more easily the kickstand can be moved out of the way by contact with the ground.

However, the extent to which stowage of the kickstand can be facilitated by weak springs and shallow detents is limited in practicality, since it is necessary that the kickstand be sufficiently strongly held in the lowered position to ensure safe support of the motorcycle in its parked state.

The more secure kickstands include an arm which is lowerable on a rotating axis and which is able to pass forward "over center" position of the arm. In this case, the weight of the machine assists in holding the kickstand in proper position, since the kickstand arm must again pass back over center to be raised. The machine then must be intentionally set upright to permit rotation of the kickstand way from its lowered position.

However, this over center arrangement, which makes the kickstand more reliable and secure in parking the motorcycle, acts like a vaulting-pole, if the kickstand is forgotten in its lowered position since, if it engages the ground in an attempted turn, the machine's motion will rotate the arm rearward, forcing the machine upward until the kickstand arm passes over-center and is then free to rotate upwardly.

Prior kickstand arrangements have not been found to be entirely satisfactory.

SUMMARY OF THE INVENTION

The present invention relates to safety systems for vehicles and is concerned, more particularly, with an ignition system which is inoperable when the kickstand is not in its proper configuration for operation of the motor vehicle and is concerned, more particularly, with means for defeating the engine when the kickstand is in its storage position.

In general, the preferred form of the present invention includes defeat means for the electrical system of a vehicle of the motorcycle or motor-driven bicycle type which includes an ignition-preventing switch in the engines electrical circuit, which switch is operable to defeat the engine during the time that the kickstand is in the vehicle-stowing position.

In a magneto-type ignition system, the defeat switch preferably is a normally closed switch which grounds the magneto and which is opened by engagement by the kickstand or a portion thereof, when the kickstand is raised to the operating position of the vehicle.

In other ignition systems, the defeat switch is a normally-open switch which breaks the ignition circuit in the vehicle-storage position and recloses the break in the circuit when the kickstand is in the operating position.

OBJECTS OF THE INVENTION

It is an object of the invention to provide a reliable system for preventing the operation of a motorcycle while it is in a dangerous configuration.

It is a further object of the invention to provide a simple and reliable system for preventing operation of a motor-powered, two wheel cycle while its storage stand is in storage position.

It is a more particular object of the invention to provide a simple and reliable safety system for motorcycles which defeats an operating system of the engine until the storage stand is in proper position for safe operation of the cycle.

It is a special object of the system to provide a simple and reliable safety system for motorcycles which defeats the electrical system of the engine whenever the storage stand is not in a safe position for operation of the cycle.

BRIEF DESCRIPTION OF THE DRAWINGS

These and other objects of the invention will be more readily understood from the following description and the accompanying drawings, in which.

DESCRIPTION OF THE PREFERRED EMBODIMENT

Figure 1:
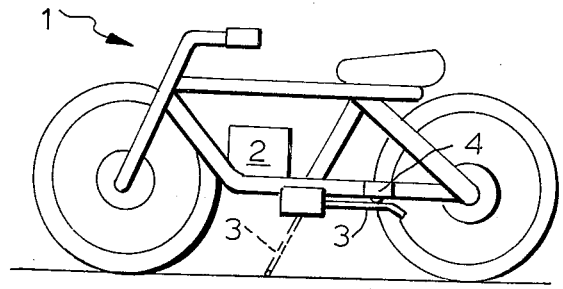
FIG. 1 is a side view of a motorcycle embodying the invention.
Figure 2:
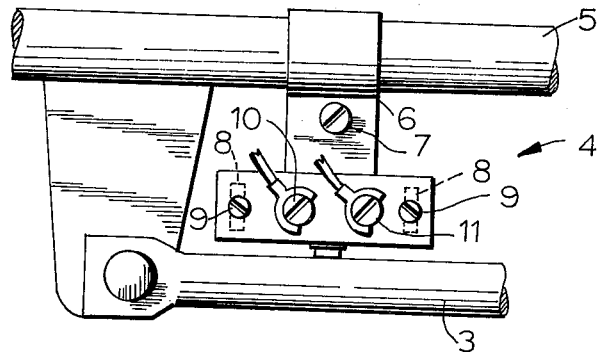
FIG. 2 is a view of a portion of FIG. 1, on an enlarged scale.
Figure 3:
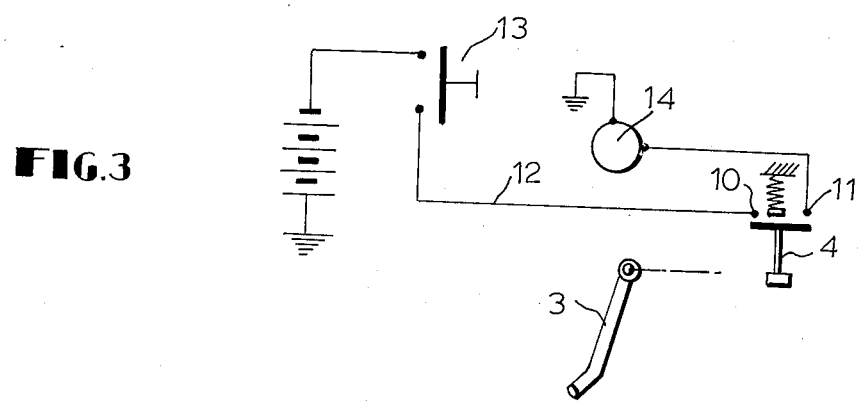
FIG. 3 is a schematic diagram of the starting circuit of an electrical-start motorcycle embodying the invention.

As shown in FIGS. 1–3, the preferred form of the invention comprises a motorcycle 1 including an engine 2 and a storage stand or kickstand 3, which, in FIGS. 1 and 2, is shown in solid lines in its raised or proper running position and, in dotted lines, in its lowered or cycle-supporting position.

As best shown in FIG. 2, the motorcycle carries an engine-defeat switch 4 mounted on its frame 5 and positioned to be engaged by the kickstand 3 in its raised position. Preferably, the switch 4 is mounted via a clamp member 6 having a clamping bolt 7, so that the assembly is longitudinally adjustable on the frame member 5. Also, it is preferable to provide vertical adjusting means such as the slots 8 about the mounting screws 9 to adjust the position and engagement-point of the switch 4 with regard to the actual raised position of the kickstand 3. The switch 4 carries two terminals 10 and 11, respectively, which are in circuit with the electrical system of the engine 2, as discussed hereinafter.

As shown in FIG. 3, the engine-defeat switch 4 is a normally-open switch installed in the line 12, via terminals 10 and 11, between the manual start switch 13 and the starter motor 14, the line 12 being energized by a conventional battery B. The switch 4 is positioned to be engaged and closed by the kickstand 3, in its raised position, so that the circuit between the manual start switch 13 and the starter 14 is then closed.

In operation of the embodiment of FIGS. 1 to 3, raising of the kickstand 3 to its proper running position closes the line 12 to permit optional starting of the engine by the manual start switch 13.

However, if the motorcycle operator forgets to raise the kickstand 3, the normally-open switch 4 continues to open or break the line 12, thereby rendering ineffective the start button 13 and starter 14, and preventing operation of the motor. Upon subsequent raising of the kickstand to its proper running position, the line 12 is closed by the switch 4, thereby permitting operation of the engine.

Figure 4:
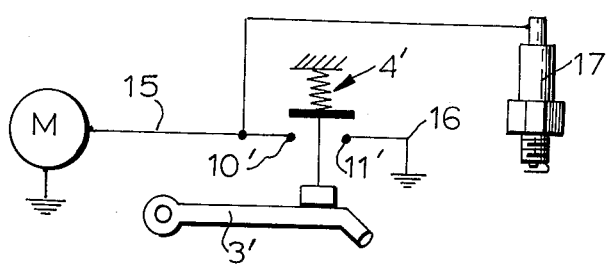
FIG. 4 is a schematic diagram of the ignition circuit of a motorcycle embodying the invention.

A modified form of the invention is shown in FIG. 4, in which the same numerals, primed, are used to denote elements corresponding to the elements of FIGS. 1-3.

As shown in FIG. 4, the engine defeating switch 4' is biased to be normally-closed and is installed via its terminals 10', 11' between an ignition line 15 and a line 16 connected to the electrical ground of a magneto "M," and, therefore, in parallel with the ignition member or spark plug 17.

In operation of the embodiment of FIG. 4, the switch 4' is engaged and held open by the kickstand 3', when raised to its proper running position, so that the engine may be started by any suitable means (not shown) such as a kick-starter or a starting motor.

However, if the motorcycle operator forgets to raise the kickstand 3', the normally-closed switch 4' shorts out to ground the magneto M and the terminal of the spark plug 17, thereby preventing firing of the engine, regardless of any starting effort.

Upon subsequent raising of the kickstand to its proper running position, the kickstand 3' engages and opens the normally-closed switch 4', thereby isolating the line 15 from "ground" except via the spark plug 17, thereby permitting starting of the engine.

Therefore, it is apparent that the present invention provides a particularly advantageous safety system for motorcycles and motor-driven vehicles having kickstands or like storage stands.

Various changes may be made in the details of the invention as disclosed without sacrificing the advantages thereof or departing from the scope of the appended claims.

What is claimed is:

1. A safety system for motor vehicles including
   an engine and
   a storage stand, said safety system having engine-defeating means including
      an engine defeat switch, said switch being positioned to be engaged by said storage stand when said stand is in its raised position, said engine-defeating means including
      an engine-operating electrical circuit and said switch being connected in said circuit to defeat said circuit and said engine until said storage stand is in its raised position.

2. The safety system of claim 1 in which said engine-operating electrical circuit includes starting circuit having a battery, a starter and a starter switch, and said engine defeat switch is a normally open switch in said starting circuit.

3. The safety system of claim 1 in which said engine defeat switch is connected to ground in parallel with an ignition member of said engine-operating electrical circuit.

4. The safety system of claim 3 in which said parallel ignition member is a spark plug.

5. The safety system of claim 3 in which the engine-operating system includes a magneto and a spark plug and said engine defeat switch is connected to ground said magneto.

* * * * *